United States Patent
Nakamura (10) Patent No.: US 10,761,789 B2
(45) Date of Patent: Sep. 1, 2020

(54) INFORMATION PROCESSING APPARATUS, PRINTING METHOD, AND RECORDING MEDIUM

(71) Applicant: Aoi Nakamura, Kanagawa (JP)

(72) Inventor: Aoi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/577,083

(22) Filed: Sep. 20, 2019

(65) Prior Publication Data

US 2020/0097229 A1 Mar. 26, 2020

(30) Foreign Application Priority Data

Sep. 25, 2018 (JP) ................. 2018-179196

(51) Int. Cl.
*G06F 3/12* (2006.01)

(52) U.S. Cl.
CPC .......... *G06F 3/1222* (2013.01); *G06F 3/1204* (2013.01); *G06F 3/1238* (2013.01)

(58) Field of Classification Search
CPC ..... G06F 3/1222; G06F 3/1238; G06F 3/1204
USPC ....................................................... 358/1.14
See application file for complete search history.

(56) References Cited

U.S. PATENT DOCUMENTS

2013/0335770 A1* 12/2013 Yasukawa ............. G06F 3/1238
358/1.14
2014/0036305 A1* 2/2014 Nakamura ................ G06F 3/14
358/1.15

FOREIGN PATENT DOCUMENTS

JP 2015-111376 6/2015

* cited by examiner

*Primary Examiner* — Tammy Paige Goddard
*Assistant Examiner* — Darryl V Dottin
(74) *Attorney, Agent, or Firm* — Oblon, McClelland, Maier & Neustadt, L.L.P.

(57) ABSTRACT

An information processing apparatus includes circuitry to: generate print data; generate identification information, the identification information including a device name identifying a device communicably connected to the information processing apparatus via a network and a user name identifying the logged-in user; determine whether a setting value is designated for a particular print setting; read a setting value associated with the particular print setting from a memory when a setting value is not designated for the particular print setting, the memory storing one or more print settings, a setting value for each print setting, and identification information in association; and transmit, to the device communicably connected to the information processing apparatus, the print data having a print command corresponding to the particular print setting.

16 Claims, 11 Drawing Sheets

```
argv[0]="_10_60_135_145"
argv[1]="134"
argv[2]="login_user"
argv[3]="NAME UNSET"
argv[4]="1"
argv[5]="AP_ColorMatchingMode=AP_ApplicationColorMatching AP_D_InputSlot= noBookletBinding..b.
BookletType..n.=0 collate com.apple.print.DocumentTicket.PMSpoolFormat=application/pdf
com.apple.print.JobInfo.PMApplicationName= TEXT EDIT
com.apple.print.JobInfo.PMJobName= NAME UNSET com.apple.print.JobInfo.PMJobOwner=login_user (
OMITTED)com.ricoh.printsettings.11AUserID=userid (OMITTED)"
```

FIG. 8

```
*PPD-Adobe: "4.3"
*RIUserIDStringloginUserA: useridA
*cupsLanguages: "ja"
*%
*%  Printer Description file
*%    for "RICOH MP C3003 JPN PS"
*%
*%    CreationDate: 2012/02/10
*%    Modified:    2013/10/07
*%
*%    COPYRIGHT (C) 2012-20133 RICOH COMPANY, LTD.
*%    All rights reserved.
*%
*FileVersion: "2.0"
*FormatVersion: "4.3"
*LanguageEncoding: ISOLatin1
*LanguageVersion: English
*ModelName: "RICOH MP C3003 JPN"
*PCFileName: "RI3371D3.PPD"
*Manufacturer: "RICOH"
*Product: "(RICOH MP C3003 JPN PS3)"
*PSVersion: "(3018.102) 2"
*ShortNickName: "RICOH MP C3003 JPN PS"
*NickName: "RICOH MP C3003 JPN PS"
```

FIG. 11

INFORMATION PROCESSING APPARATUS, PRINTING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-179196, filed on Sep. 25, 2018, in the Japan Patent Office, the entire disclosure of which is hereby incorporated by reference herein.

BACKGROUND

Technical Field

The present invention relates to an information processing apparatus, a printing method, and a recording medium.

Description of the Related Art

A technique that allows setting of a user ID and a password in an image forming apparatus such as a printer, for example, to manage printing by a department has already been known.

In order to save time for re-entering the user ID and the password, when printing, a printer driver may be caused to read a user ID and a password stored in a printer description file.

However, in case of printing from an application that does not use a printer driver, a user ID and a password are not able to be read to authenticate a user. When printing from an application that does not use a printer driver, it has been impossible to use print settings, such as a user ID and a password.

SUMMARY

Example embodiments of the present invention include an information processing apparatus including circuitry to: generate print data; generate identification information, the identification information including a device name identifying a device communicably connected to the information processing apparatus via a network and a user name identifying the logged-in user; determine whether a setting value is designated for a particular print setting; read a setting value associated with the particular print setting from a memory when a setting value is not designated for the particular print setting, the memory storing one or more print settings, a setting value for each print setting, and identification information in association; and transmit, to the device communicably connected to the information processing apparatus, the print data having a print command corresponding to the particular print setting.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A detailed description will hereinafter be made on an embodiment of an information processing apparatus, a printing method, and a program stored in a non-transitory recording medium according to the present invention with reference to FIG. 1 to FIG. 11. The present invention is not limited to the following description, and constituent elements in the following embodiment includes constituent elements that could easily be arrived by a person skilled in the art, that are substantially the same, and that fall within the scope of so-called equivalents. Furthermore, various omissions, substitutions, changes, and combinations can be made without departing from the gist of the following embodiment.

(Overall System Configuration)

Figure 1:
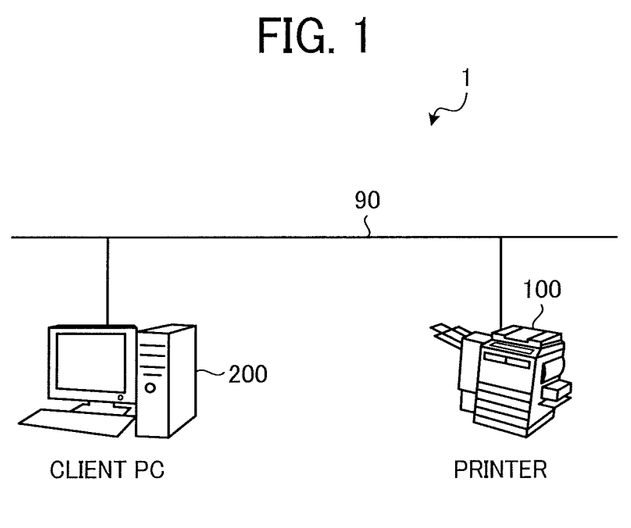
FIG. 1 is a schematic diagram illustrating an example of a configuration of a system according to an embodiment.

FIG. 1 is a schematic diagram illustrating an example configuration of a system 1 according to the embodiment. The system 1 includes a client PC 200 and a printer 100, which is communicably connected via a network 90. The client PC 200, as an example of an information processing apparatus, communicates with the printer 100, as an example of a device, via the network 90. A detailed description will hereinafter be made on the system 1 of the embodiment.

As illustrated in FIG. 1, the system 1 of the embodiment includes the client PC 200 and the printer 100. The client PC 200 and the printer 100 are connected to each other via the network 90. For example, the network 90 is a corporate computer network such as a corporate local area network (LAN) in a corporate office or the like.

The printer 100 as a device (more specifically, an image forming apparatus) has a print function, for example. The client PC 200 as the information processing apparatus transmits print data, such as image data, and information on a print setting to the printer 100 via the network 90 for printing. However, the present invention is not limited thereto, and any number of the client PC 200 and any number of the printer 100 can be provided.

(Hardware Configuration of Printer)

Figure 2:
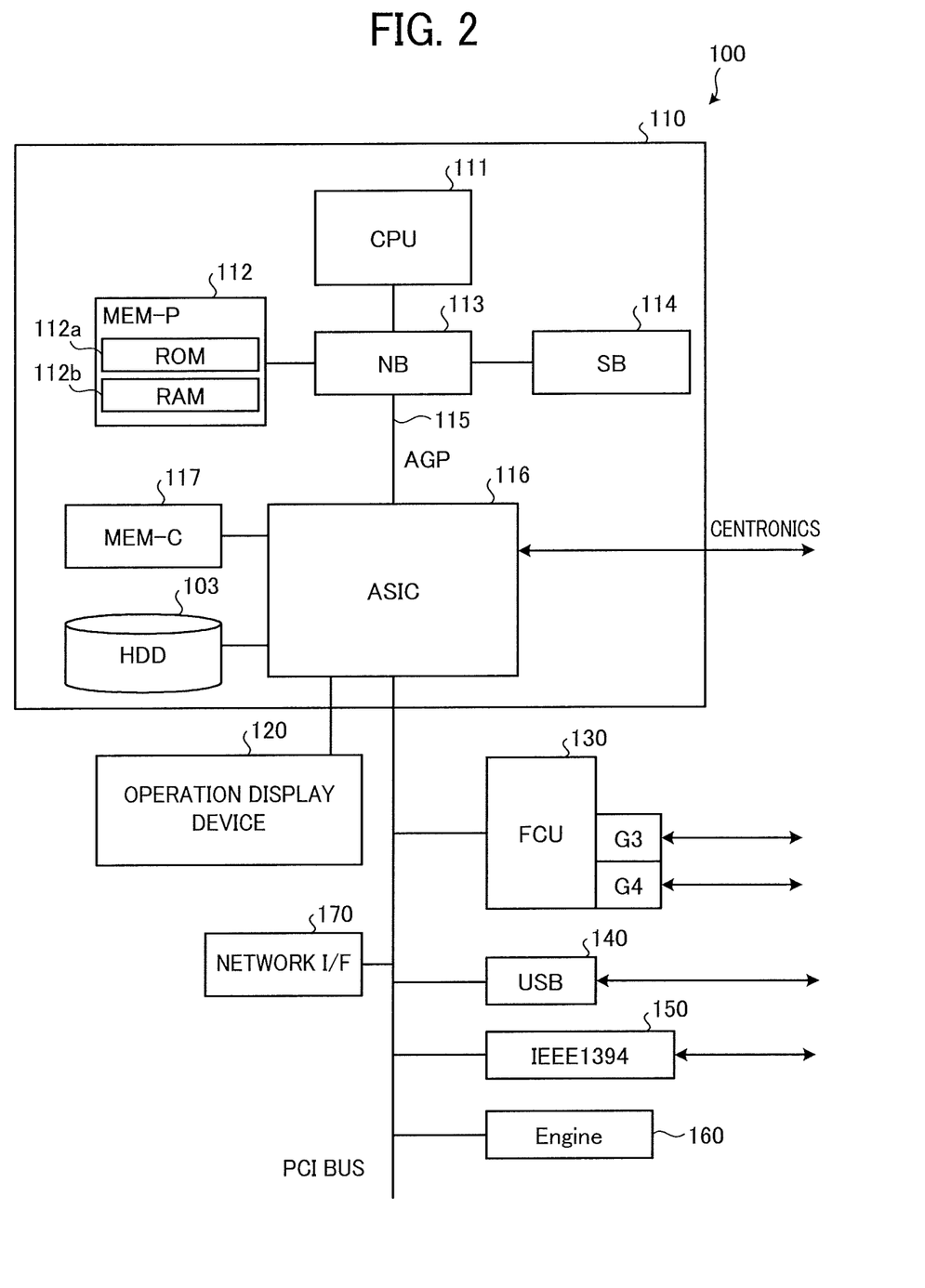
FIG. 2 is a block diagram illustrating a hardware configuration of a printer according to the embodiment.

FIG. 2 is a block diagram illustrating a hardware configuration of the printer 100 according to the embodiment. As illustrated in FIG. 2, the printer 100 has a configuration that a controller 110 and an engine 160 are coupled to each other by a peripheral component interface (PCI) bus.

The engine 160 is a printer engine that can be coupled to the PCI bus, and includes a black-and-white plotter, a one-drum color plotter, and a four-drum color plotter, for example. This engine 160 includes, in addition to so-called engine portions such as the plotters, image processing portions such as for error diffusion and gamma conversion.

The controller 110 controls the entire printer 100, drawing and communication of the printer 100, and input from an operation display device 120 provided in the printer 100. More specifically, the controller 110 includes a central processing unit (CPU) 111, a north bridge (NB) 113, a system memory (MEM-P) 112, a south bridge (SB) 114, a local memory (MEM-C) 117, an application specific integrated circuit (ASIC) 116, and a hard disk drive (HDD) 103.

The CPU 111 executes overall control of the printer 100. The CPU 111 is coupled to another device via a chipset including the NB 113, the MEM-P 112, and the SB 114. The NB 113 and the ASIC 116 are coupled by an accelerated graphics port (AGP) bus 115. The ASIC 116 may directly be coupled to the client PC 200 via a Centronics cable, for example.

The NB 113 is a bridge that couples the CPU 111 to the MEM-P 112, the SB 114, and the AGP bus 115, and includes: a memory controller that controls reading from and writing to the MEM-P 112; and a PCI master and an AGP target.

The SB 114 is a bridge that couples the NB 113 to a PCI device and a peripheral device. The NB 113 is coupled to the SB 114 via the PCI bus. A network interface (I/F) 170 that mutually communicates with the client PC 200, and the like are also coupled to the PCI bus.

The MEM-P 112 is a system memory used as a storage memory for a program and data, a loading memory for the program and the data, a drawing memory for the printer 100, and the like. The MEM-P 112 includes a read only memory (ROM) 112a and a random access memory (RAM) 112b.

The ROM 112a is a read only memory used as the storage memory for the program and the data. The RAM 112b is a writable and readable memory used as the loading memory for the program and the data, the drawing memory for the printer 100, and the like.

The ASIC 116 is an integrated circuit (IC) for an image processing application that includes hardware elements for image processing. The ASIC 116 functions as a bridge that couples the AGP bus 115, the PCI bus, the HDD 103, and the MEM-C 117. The ASIC 116 includes: a PCI target and an AGP master; an arbiter (ARB) as a core of the ASIC 116; a memory controller that controls the MEM-C 117; plural direct memory access controllers (DMACs); and a PCI unit. Each of the DMACs performs rotation of the image data, and the like by hardware logic and the like. The PCI unit performs data transfer with the engine 160 via the PCI bus.

A facsimile control unit (FCU) 130, a universal serial bus (USB) 140, an Institute of Electrical and Electronics Engineers 1394 (IEEE 1394) interface 150 are coupled to the ASIC 116 via the PCI bus. The operation display device 120 is directly coupled to the ASIC 116.

The MEM-C 117 is used as a copy image buffer and a code buffer.

The HDD 103 is a storage that accumulates the image data, the programs, font data, and forms. The HDD 103 saves a license file of an application executed by the printer 100.

The AGP bus 115 is a bus interface for a graphics accelerator card implemented to accelerate graphics processing. The AGP bus 115 directly accesses the MEM-P 112 with high throughout, so as to make the graphics accelerator card fast.

(Hardware Configuration of Client PC)

Figure 3:
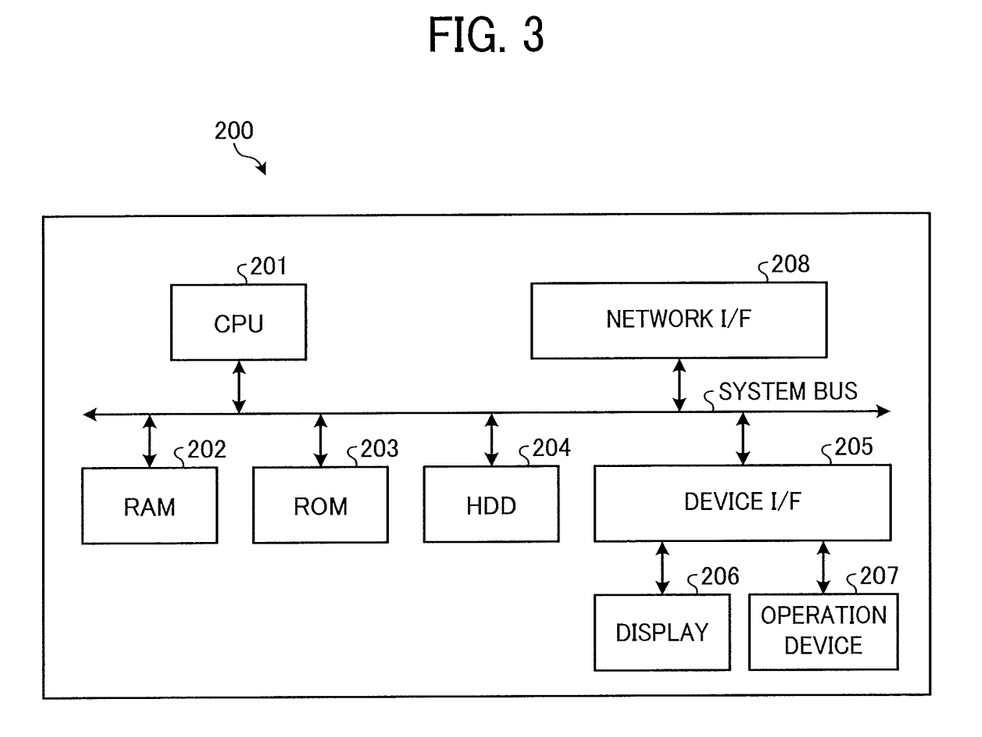
FIG. 3 is a diagram illustrating an example of a hardware configuration of a client PC (personal computer) according to the embodiment.

FIG. 3 is a diagram illustrating an example of a hardware configuration of the client PC 200 according to the embodiment. As illustrated in FIG. 3, the client PC 200 includes a CPU 201, RAM 202, ROM 203, an HDD 204, a device I/F 205, and a network I/F 208, and these are mutually coupled by a system bus. A display 206 and an operation device 207 are coupled to the device I/F 205.

The CPU 201 is an arithmetic unit and centrally controls entire operation of the client PC 200. The RAM 202 is a volatile storage medium capable of high-speed reading and writing of information, and is used as a work area when the CPU 201 processes the information. The ROM 203 is a read only non-volatile storage medium, and stores a program such as firmware.

The HDD 204 is a non-volatile storage medium capable of reading and writing the information, and stores an operating system (OS), various control programs, application programs, and the like. The HDD 204 also stores files, data, and the like to realize various functions of the client PC 200.

The device I/F 205 is an interface that couples each of the display 206 and the operation device 207 to the system bus. The display 206 is a visual user interface that displaying various types of the information, and implemented by a liquid crystal display (LCD) and the like, for example. The operation device 207 is a user interface, such as a keyboard and a mouse, that allows a user to input the various types of the information to the client PC 200.

The network I/F 208 is an interface that connects the client PC 200 to the network 90.

In such a hardware configuration, the CPU 201 performing calculation according to the program stored in the ROM 203 or a program loaded into the RAM 202 from at least one of the HDD 204 and an unillustrated storage medium such as an optical disc, and a software control unit is thereby configured. A combination of the software control unit, which is configured just as described, and hardware constitute a functional block that implements a function of the client PC 200.

The program for the client PC 200 may be a file in an installable format or an executable format, and may be recorded and distributed in a computer readable recording medium such as a recording medium.

(Functional Configuration of Client PC)

Figure 4:
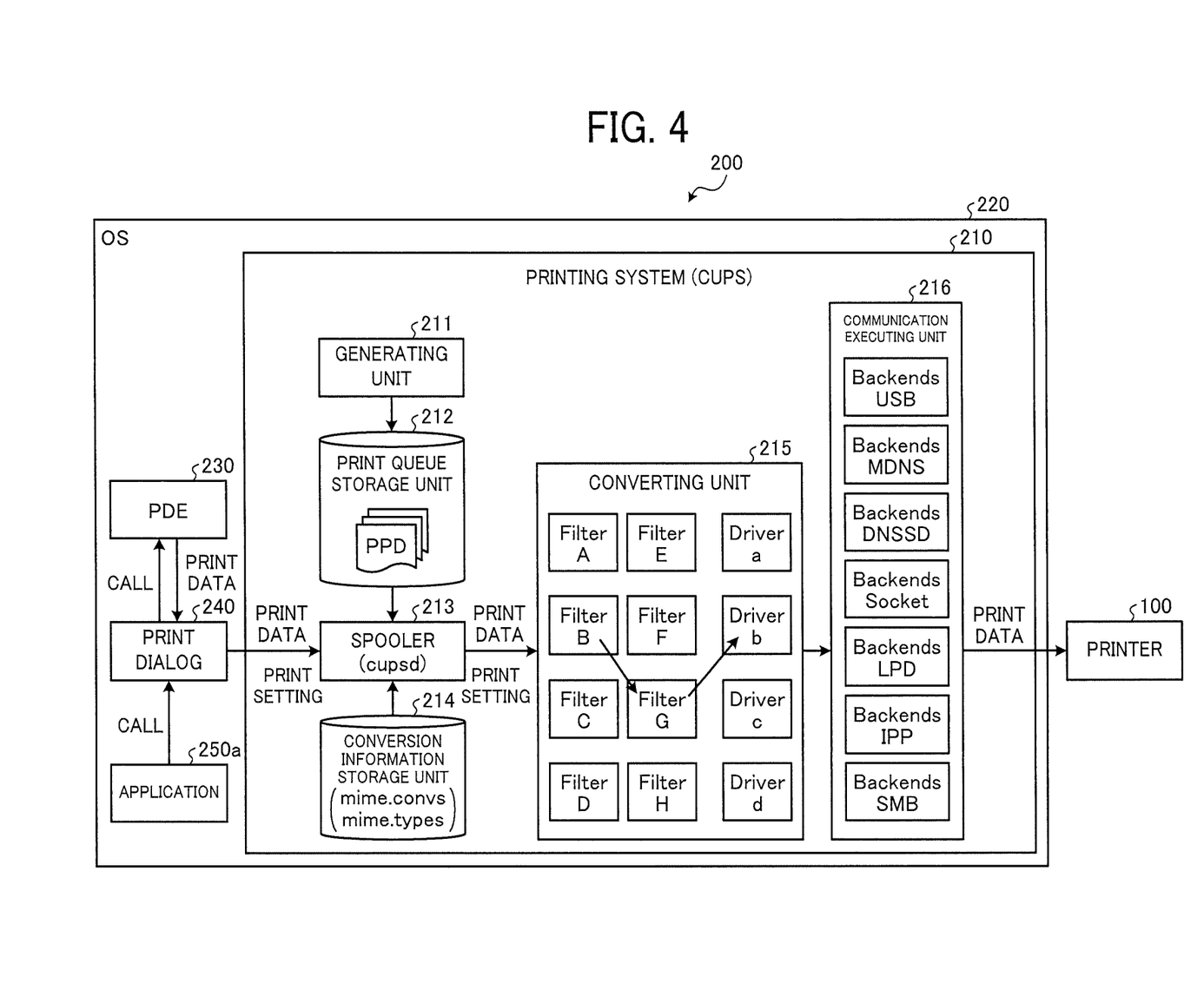
FIG. 4 is a diagram illustrating an example of a functional configuration of the client PC according to the embodiment.

FIG. 4 is a diagram illustrating an example of the functional configuration and the operation of the client PC 200 according to the embodiment. As illustrated in FIG. 4, the client PC 200 includes, on an OS 220, print dialog extension (PDE) 230, a print dialog 240, an application 250, and a Common Unix® Printing System (CUPS) 210.

The printing system 210 includes a generating unit 211, a print queue storage unit 212, a spooler (cupsd) 213, a conversion information storage unit (mime.convs, mime.types) 214, a converting unit 215, and a communication executing unit 216.

The generating unit 211 is one example of an Autosetup Tool, and is a program that rewrites the print queue storage unit 212 in order to create a print queue. For example, when creating the print queue, the generating unit 211 checks an IP address of the coupled printer 100, and saves association information, in which the IP address is associated with the print queue, in the print queue storage unit 212. In the case of a print protocol, such as the USB or Bluetooth®, that is not the Internet protocol, the generating unit 211 saves the association information, which describes no IP address in the print queue, in the print queue storage unit 212. The Autosetup Tool is generally developed and provided by a printer vendor.

The print queue storage unit 212 saves printer settings that include, for example, information on the printing system 210, information on the print protocol to be used, an address of a connection destination on the protocol, information on the coupled printer (a device name), and information on the user who logs in (a user name). In addition, the print queue storage unit 212 holds a Postscript Printer Description (PPD), in which information on each model of PostScript® printers is recorded. A driver of the PostScript printer refers to the PPD when printing.

The spooler 213 is one example of cupsd. When printing, in order to convert a format of the print data received from the application 250 into a format of the print data to be output to the printer 100 described in the print queue storage unit 212, the spooler 213 refers to the conversion information storage unit 214, and forms a filter pipeline with low processing cost, so as to make the print data flow to the filter pipeline. To "form the filter pipeline" means that filters through which the print data flows (for example, Filters and Drivers of the converting unit 215 and Backends of the communication executing unit 216) are sequentially arranged. The Filters include the Drivers and the Backends. Here, as information on the processing cost, items such as a processing load, that image quality does not deteriorate, and that processing efficiency is superior are comprehensively evaluated, and a weighting value is added to each of the individual filters. Then, when the filters are arranged in an ascending order of the weighting value, the filter pipeline with the low processing cost can be formed.

The conversion information storage unit 214 is one example of mime.convs and mime.types, and is stored as information for forming the filter pipeline from the beginning by the printing system 210. In the conversion information storage unit 214, an input data format, an output data format, the information on the processing cost, and the like are saved for each of the Filters provided in the printing system 210. For example, in the case of Mac OS X®, /usr/share/cups/mime/apple.convs and /usr/share/cups/mime/mime.convs correspond to the formats. In mime.types, a rule for determining a file type of print data is defined. For example, in the case of Mac OS X®, /usr/share/cups/mime/apple.types and /usr/share/cups/mime/mime.types correspond to the file types.

The converting unit 215 includes Filters A to H and Drivers a to d. Each of the Filters converts the format of print data. The printing system 210 has various Filters from the beginning in order to handle various input formats and various output formats. Such Filters are a Filter that converts PDF data to PostScript data, a Filter that converts the PDF data to Raster data, a Filter that converts the Raster data to tiff data, and the like. For example, in the case of Mac OS X®, the Filters that are provided in the printing system 210 from the beginning is stored in /usr/libexec/cups/filter/.

The Driver is a Filter that is generally provided by the printer vendor, and, after the data conversion by the Filter is completed, converts the data format to a print data format unique to the printer vendor or adds a print command unique to the printer vendor to the print data. The print queue defines which Driver to be used when printing.

The communication executing unit 216 as a transmitting unit is implemented by the plural Backends. In the example illustrated in FIG. 4, the communication executing unit 216 includes Backends USB to Backends SMB. Each of the Backends provided in the communication executing unit 216 has a function as a communication module that communicates with the printer 100. Each of the Backends provided in the communication executing unit 216 is an execution file that is independent of each other. In addition, each of the Backends provided in the communication executing unit 216 is compatible of a respective communication protocol. That is, there is one Backend that is compatible with one communication protocol.

An application 250a as a data generating unit is a general application that is installed and used in the OS 220, and generates the print data. Unlike an application 250b, which will be described later, the application 250a executes printing by using a printer driver.

The print dialog 240 as a setting designating unit is provided by the OS 220. The print dialog 240 provides a user interface used to select a printer function that the user wishes to use, such as input of setting values for double-sided printing. Basically, as the user interface, the contents described in the PPD are displayed by the OS 220.

The PDE 230 is a plug-in module provided by the printer vendor, and is a module used by the printer vendor to provide its own user interface. The PDE 230 is displayed as a part of the print dialog when the print dialog is expanded by the plug-in to provide a rich user interface. User authentication by the user ID, the password, and the like is performed to prevent leakage of the information or to manage printing by a department.

Figure 5:
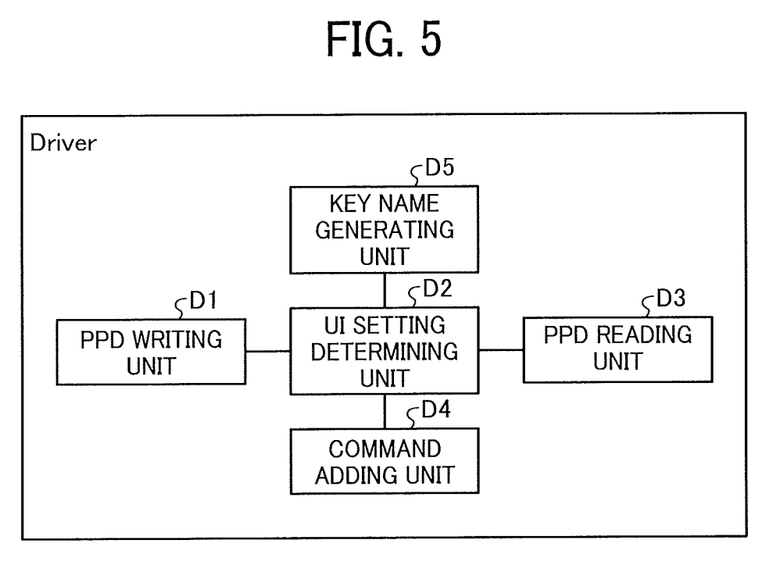
FIG. 5 is a diagram illustrating an example of a functional configuration of a Driver according to the embodiment.

A description will herein be made on a configuration example of the Driver provided in the converting unit 215 with reference to FIG. 5.

FIG. 5 is a diagram illustrating an example of a functional configuration of the Driver according to the embodiment. As illustrated in FIG. 5, each of the Drivers a to d includes a PPD writing unit D1, a user interface (UI) setting determining unit D2, a PPD reading unit D3, a command adding unit D4, and a key name generating unit D5.

The UI setting determining unit D2 as a determining unit determines whether a setting value is designated by the print dialog 240 provided by the OS 220 and the PDE 230 for each of the print settings such as the user ID, the password, the double-sided printing, and sheet size.

The key name generating unit D5 as an identification information generating unit generates a key name (identification information) that includes: the device name representing the printer 100 as the connection destination; and the user name representing the user who logs in.

When the setting value is designated, the UI setting determining unit D2 instructs the PPD writing unit D1 to store the print setting, the setting value, and the key name in the PPD in association with each other. The PPD writing unit D as the writing unit links and saves the print setting, the setting value, and the key name.

When the setting value is not designated, the UI setting determining unit D2 instructs the PPD reading unit D3 to read the print setting from the PPD. The PPD reading unit D3 as the reading unit reads the print setting, the setting value, and the key name from the PPD, and reflects the read data in the current print setting, that is, the print settings used for the current printing.

When processing for all the print settings is completed, the UI setting determining unit D2 instructs the command adding unit D4 to add the print command corresponding to the print settings. the command adding unit D4 as the adding unit adds the print command, which corresponds to the print settings, to the print data, and transmits the print data to the Backends in the communication executing unit 216.

(Operation Using Printer Driver of Client PC)

Figure 6:
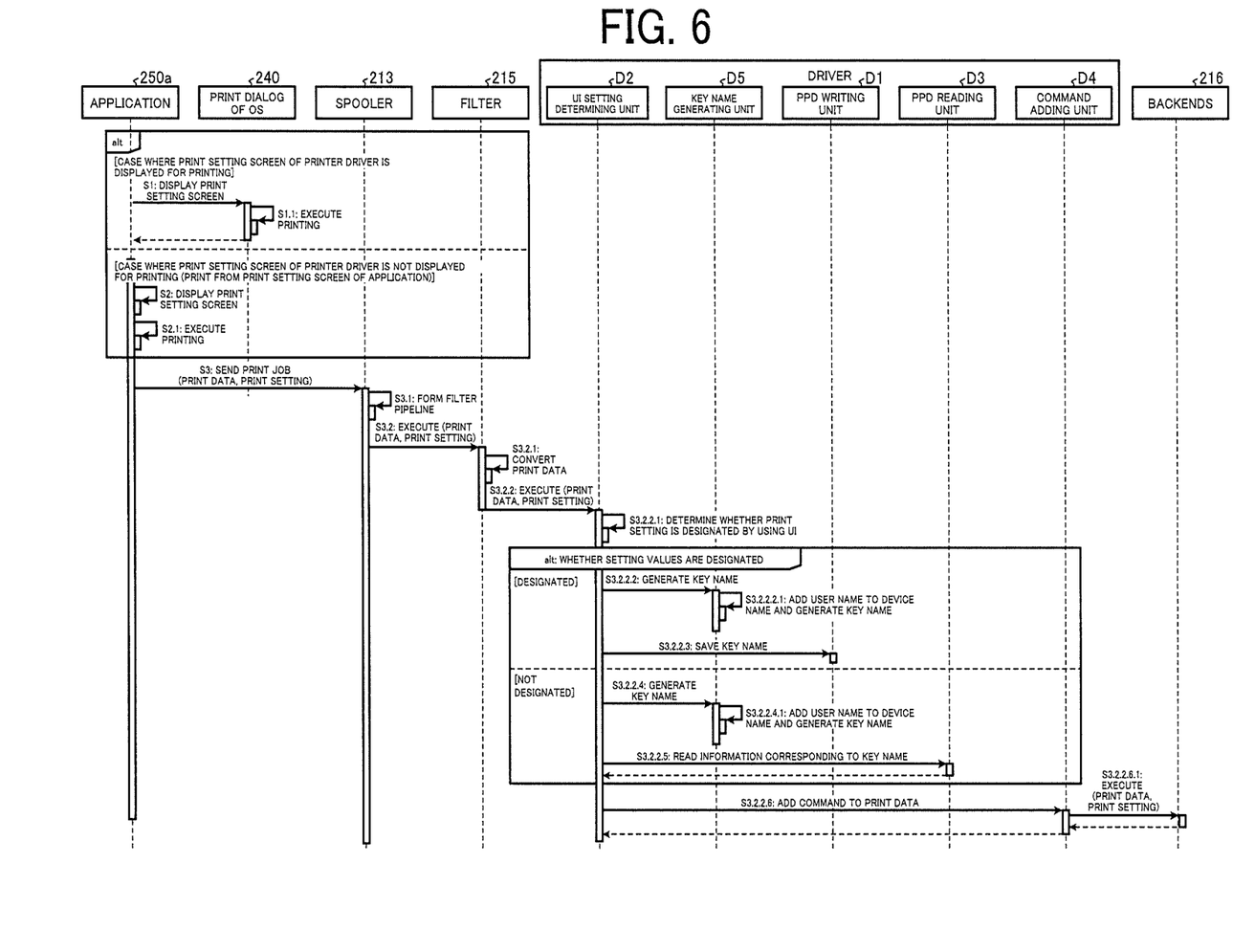
FIG. 6 is a sequence diagram illustrating an example of print operation using a printer driver in the client PC according to the embodiment.

Next, a description will be made on operation of the printer driver in the client PC 200 according to the embodiment with reference to FIG. 4 and FIG. 6. FIG. 6 is a sequence diagram illustrating an example of print operation using the printer driver in the client PC 200 according to the embodiment.

When printing is executed by the application 250a illustrated in FIG. 4, the print dialog 240 of the OS 220 determines whether to display a print setting screen of the printer driver when printing. In the case where the print setting screen of the printer driver is displayed for printing, the print dialog 240 and the PDE 230 are sequentially called. Then, the PDE 230 returns the setting values, which include the user ID, the password, and the like, to the print dialog 240, and the application 250a generates the print data (S1 to S1.1 in FIG. 6). In the case where the print setting screen of the printer driver is not displayed for printing, the application 250a displays the print setting screen, and generates the print data based on the information input on the print setting screen (S2 to S2.1 in FIG. 6). The print setting and the print data are transmitted to the spooler 213 (S3 in FIG. 6).

The spooler 213 forms the filter pipeline (S3.1 to S3.2 in FIG. 6). The file format of the print data is converted by the Filter of the converting unit 215 (S3.2.1 to S3.2.2 in FIG. 6). In addition, the Driver converts the data format of the print data to the unique print data format.

The UI setting determining unit D2 of the Driver determines whether the setting values, such as the user ID and the password, are designated for the print setting by using the user interface (S3.2.2.1 in FIG. 6).

In the case where the setting values are designated for the print setting (in the case where the print setting screen of the printer driver is displayed for printing), the key name generating unit D5 generates the key name, in which the user name indicating the user who currently logs in is added to the device name indicating the printer 100 as the connection destination (S3.2.2.2 to S3.2.2.2.1 in FIG. 6). Then, the PPD writing unit D1 saves the generated key name in the PPD (S3.2.2.3 in FIG. 6).

In the case where the setting values are not designated for the print setting (in the case where the print setting screen of the printer driver is not displayed for printing), the key name generating unit D5 generates a key name in which the user name is added to the device name (S3.2.2.2 to S3.2.2.2.1 in FIG. 6). Then, the PPD reading unit D3 reads the information (the print setting, the setting values, and the like) associated with the generated key name from the PPD (S3.2.2.5 in FIG. 6).

The Driver repeats the above sequence for all of the print settings. Thereafter, the command adding unit D4 adds the command corresponding to the print setting to the print data (S3.2.2.6 in FIG. 6), and the Backends provided in the communication executing unit 216 transmits the print data to the printer 100 (S3.2.2.6.1 in FIG. 6).

Figure 7:
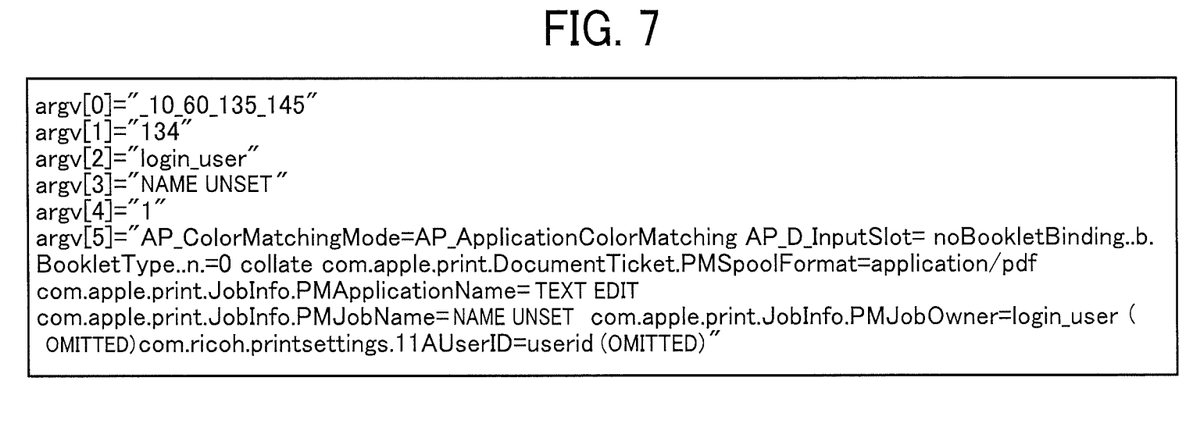
FIG. 7 is an illustration of a specific example of a print setting according to the embodiment.

Here, a specific example of the print setting, which is passed by the spooler 213 to the Filter, the Driver, and the Backends, is illustrated in FIG. 7. FIG. 7 is an illustration of the specific example of the print setting according to the embodiment. Each of the Filter, the Driver, and the Backends receives values illustrated in FIG. 7 as arguments in command lines from the spooler 213.

N in "argv[N]" represents what number the argument is in. In the fifth argument "argv[5]", lists all the print settings that are designated by using the user interface are listed. In the last line, "com.ricoh.printsettings.11AUserID=userid" indicates that a value "userid" is set for a keyword "11AUserID" defined by the printer vendor, Ricoh Company, Ltd., and "11AUserID" is the print setting of the "user ID" designated by the plug-in.

The Driver has the keyword information for all of the print settings that can be designated by the plug-in. The UI setting determining unit D2 checks whether the values are set for all of the print setting keywords, and thereby determines whether print settings are designated by using the user interface of the printer driver.

Figure 8:
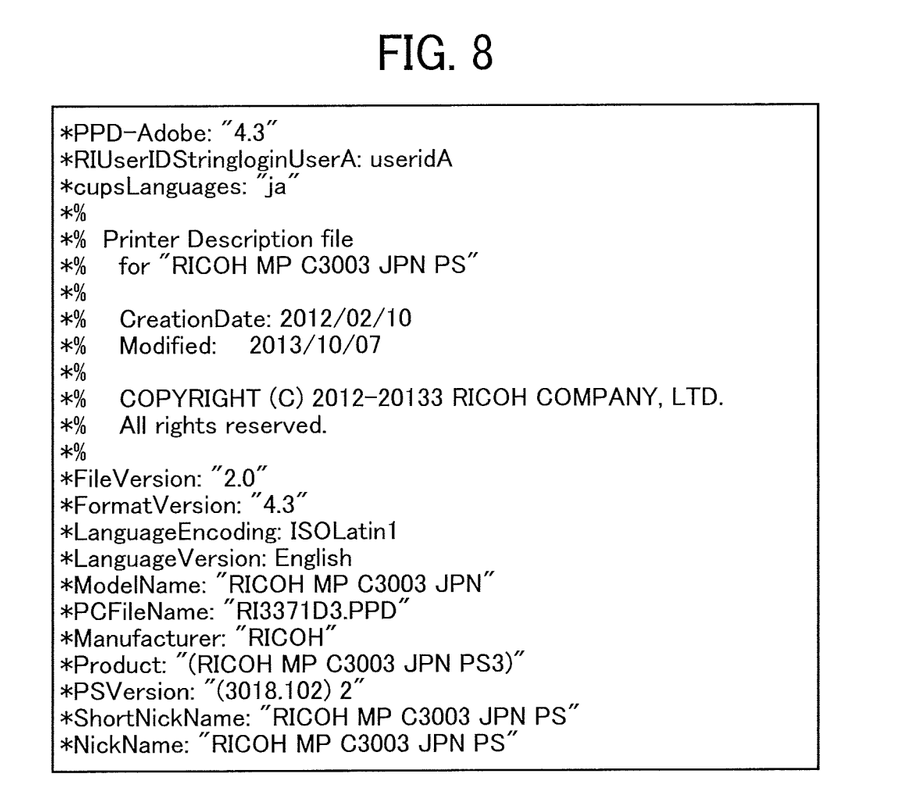
FIG. 8 is an illustration of a specific example of a print setting according to the embodiment.

The PPD, in which the print settings are saved, is illustrated in FIG. 8. FIG. 8 is an illustration of a specific example of the print settings in the PDD according to the embodiment. The PPD is a text file in which the printer-specific information is described. In the case of Mac OS X®, the PPD that corresponds to the print queue is created in a directory of /etc/cups/ppd. The print settings are saved for the PPD linked with this print queue.

In PPD grammar, a string beginning with an asterisk (*) is called a keyword, which is pre-defined as a PPD specification or freely defined by the printer vendor or the user under a certain rule. For example, "*PPD-Adobe" indicates a version of the PPD specification to which PPD conforms. A value is specified with a colon (:) after the keyword, so as to be able to link the value to the keyword. By using this, the print settings are saved in the PPD. Here, a line beginning with "*%" is ignored as a comment.

The second line "*RIUserIDStringloginUserA: useridA" in FIG. 8 is an example of saving the print setting in the PPD. "*RIUserIDStringloginUserA" is a keyword indicating the user ID of the logged-in user as loginUserA. "LoginuserA" indicates the name of the logged-in user. In the print setting, "useridA" is a value designated as the user ID. In the case where the plural users log in and each of the users saves his/her user ID, the number of the data corresponding to the number of the users who save the keyword, such as "*RIUserIDStringloginUserA: useridA" and "*RIUserIDStringloginUserB: useridB", is added to the PPD file.

The Driver can read and write the values in each of the print settings from the PPD via the keywords.

(Operation Not Using Printer Driver of Client PC)

Figure 9:
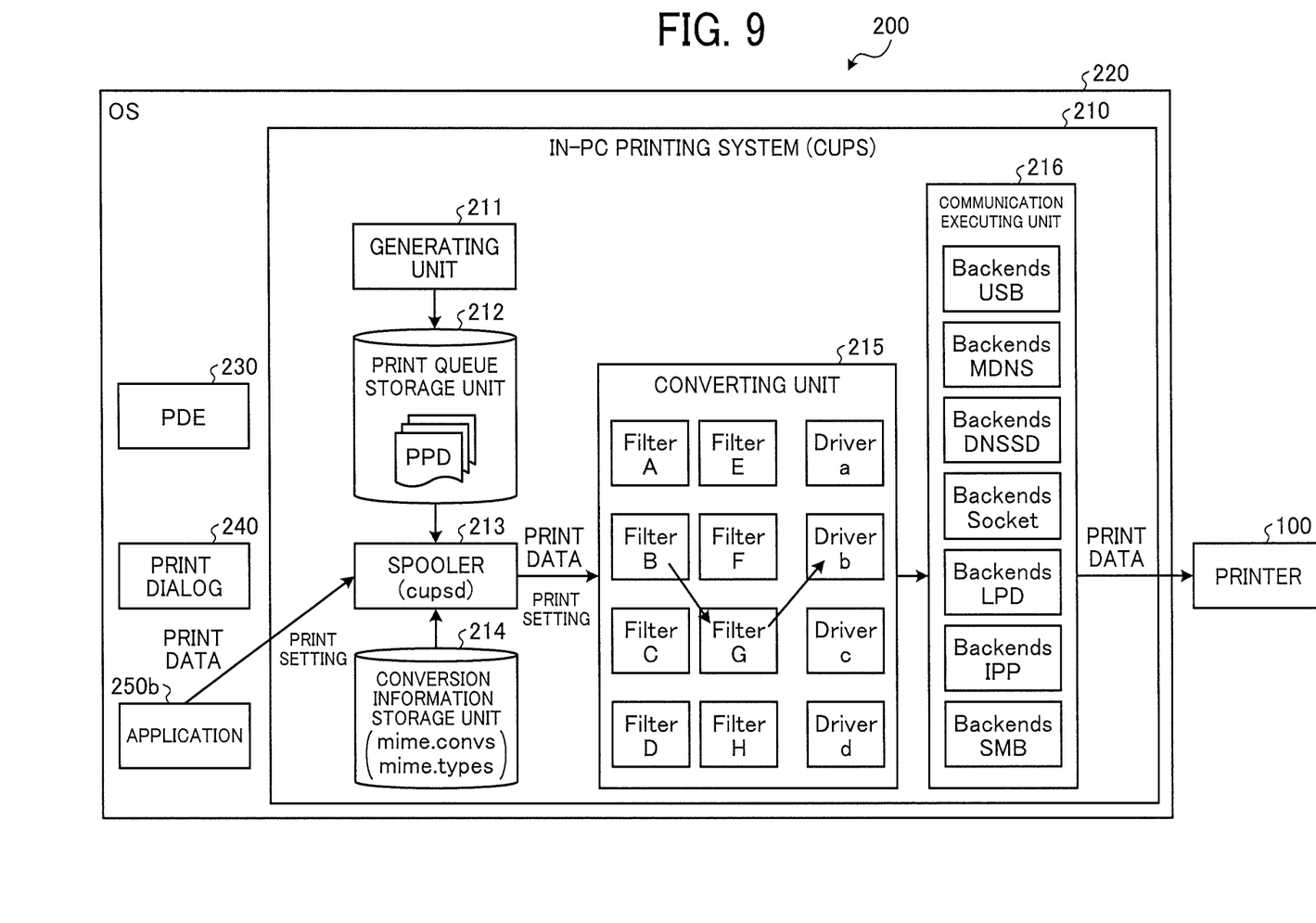
FIG. 9 is a diagram illustrating an example of the functional configuration of the client PC according to the embodiment.

Next, a description will be made on operation not using the printer driver in the client PC 200 according to the embodiment with reference to FIG. 9 and FIG. 10. FIG. 9 is a diagram illustrating an example of the functional configuration of the client PC 200 according to the embodiment.

Figure 10:
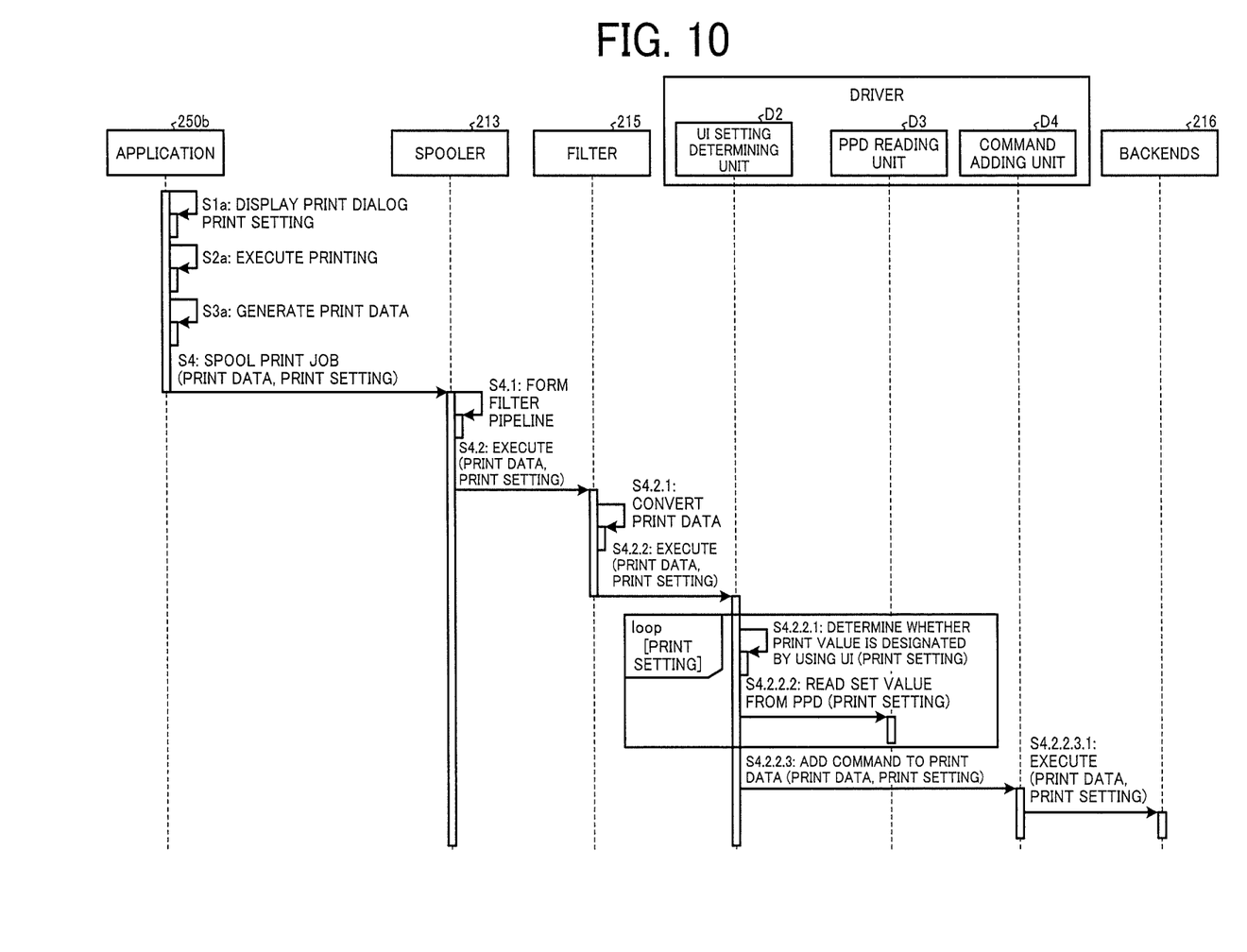
FIG. 10 is a sequence diagram illustrating an example of the print operation not using the printer driver in the client PC according to the embodiment.

FIG. 10 is a sequence diagram illustrating an example of the print operation not using the printer driver in the client PC 200 according to the embodiment.

The application 250b as the data generating unit illustrated in FIG. 9 is an application that does not use the printer driver. When printing is executed by the application 250b, the application 250b does not call the print dialog 240, and the application 250 itself directly transmits the print settings and the print data to the spooler 213 (S1a, S2a, S3a, and S4 in FIG. 10). In such a case, since the print dialog 240 is not called, the function of the printer driver, which is displayed by the plug-in of the print dialog 240, is not able to be used. That is, the setting values such as the user ID and the password are not included in the print settings transmitted from the application 250b to the spooler 213. There is a case where the application 250b itself displays the print setting screen instead of the print dialog 240 being not called.

The spooler 213 forms the filter pipeline (S4.1 to S4.2 in FIG. 10). The file format of the print data is converted by the Filter of the converting unit 215 (S4.2.1 to S4.2.2 in FIG. 10). In addition, the Driver converts the data format of the print data to the unique print data format.

The UI setting determining unit D2 of the Driver determines whether the setting values, such as the user ID and the password, are designated by using the user interface (S4.2.2.1 in FIG. 10). In the application 250b which executes printing without using the printer driver, in the case where the setting values are not included in the print settings (the setting values are not designated), the PPD reading unit D3 reads the setting values, such as the user ID and the password, from the PPD (S4.2.2.2 in FIG. 10). The key name generated by the key name generating unit D5 is linked to the values (the print settings), which are read herein. In the case where the setting values are included in the print settings, the PPD writing unit D1 saves such print settings in the PPD. The command adding unit D4 adds the command corresponding to the print settings to the print data (S4.2.2.3 in FIG. 10). The Driver repeats this sequence for all of the print settings.

Thereafter, the print data is transmitted to the printer 100 by the Backends provided in the communication executing unit 216 and is then printed (S4.2.2.3.1 in FIG. 10).

(Print Processing by Client PC)

Figure 11:
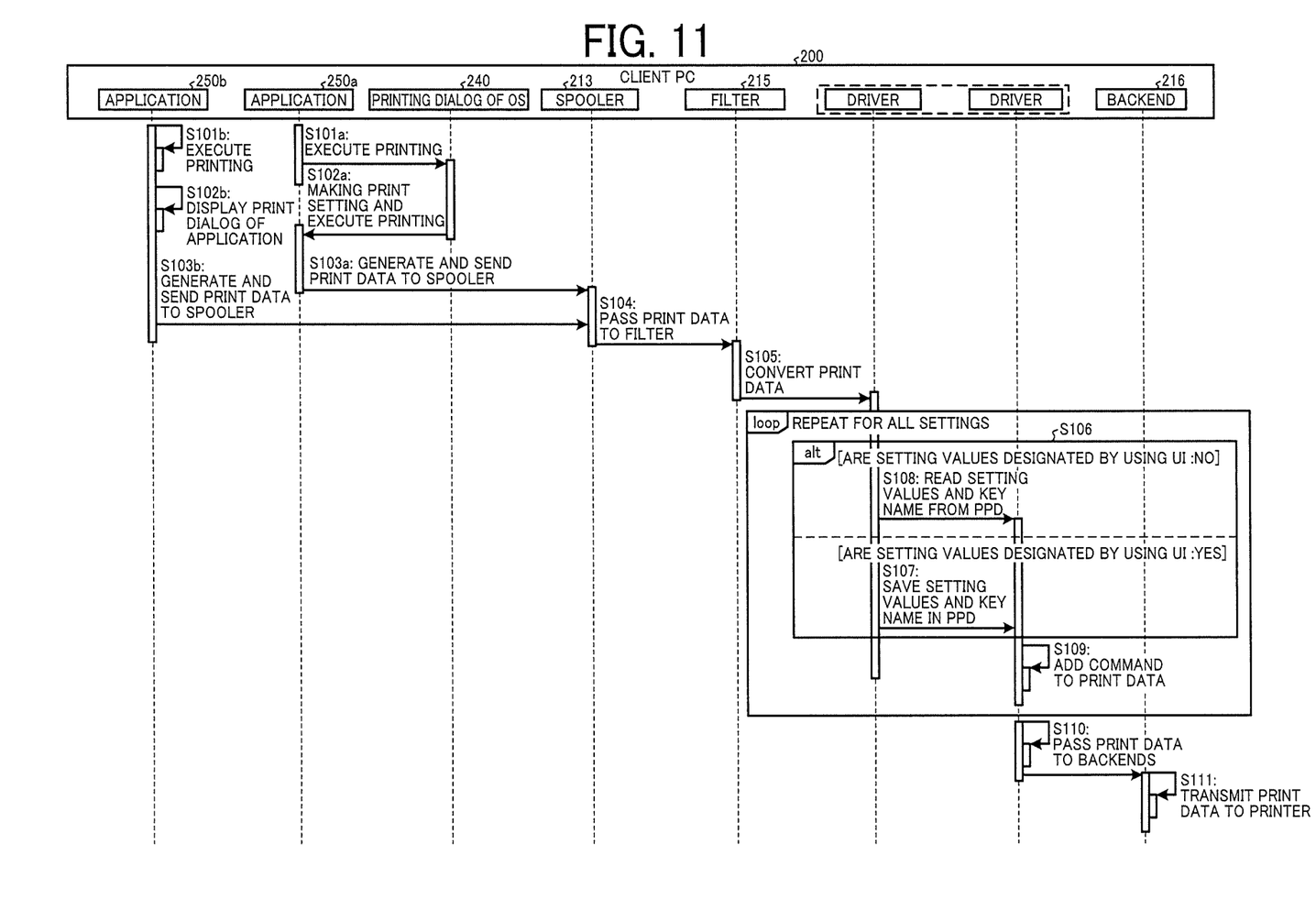
FIG. 11 is a sequence diagram illustrating an example of a procedure of print processing by the client PC according to the embodiment.

Next, a description will be made on an example of print processing by the client PC 200 according to the embodiment with reference to FIG. 11. FIG. 11 is a sequence diagram illustrating an example of a procedure of the print processing by the client PC 200 according to the embodiment.

First, the print processing from the application 250a will be described.

As illustrated in FIG. 11, when the application 250a executes printing in step S101a, in step S102a, the print dialog 240 configures the print setting, which includes setting of the user ID and the password, is executed from. In step S103a, the application 250a generates the print data, and transmits the generated print data to the spooler 213.

In step S104, the spooler 213 transfers the print data from the application 250a to the Filter. In step S105, the Filter converts the format of the print data.

In step S106, the UI setting determining unit D2 of the Driver determines whether the setting values are designated for the print setting by using the user interface. Since printing is executed from the application 250a this time (Yes), in step S107, the PPD writing unit D1 saves the print setting (the setting values) in the PPD. The key name generated by the key name generating unit D5 is linked to the print setting (the setting values) saved herein. In step S109, the command adding unit D4 adds the command to the print data. The driver repeats steps S106 to S109 for all of the print settings.

In step S110, the Driver transfers the print data to the Backends.

In step S111, the Backends transmits the print data to the printer 100. With the above, the print processing from the application 250a is terminated.

Next, the print processing from the application 250b will be described.

Referring again to FIG. 11, when the application 250b executes printing in step S101b, in step S102b, for example, the print dialog provided by the application 250b is displayed, and the print setting is made. In such print setting, setting of the user ID and the password is not included. In step S103b, the application 250b generates the print data, and transmits the generated print data to the spooler 213.

In step S104, the spooler 213 transfers the print data from the application 250b to the Filter. In step S105, the Filter converts the format of the print data.

In step S106, the UI setting determining unit D2 of the Driver determines whether the print setting is designated using the user interface. When printing is executed from the application 250b, and when the setting values are not designated in the print setting (No), in step S108, the PPD reading unit D3 reads the setting values corresponding to the print setting from the PPD. The print setting (the setting values), associated with the key name generated by the key name generating unit D5 is read herein. In step S109, the command adding unit D4 adds the command to the print data. The driver repeats steps S106 to S109 for all of the print settings.

In step S110, the Driver transfers the print data to the Backends.

In step S111, the Backends transmits the print data to the printer 100. With the above, the print processing from the application 250b is terminated.

In the background art, when the user ID and the password are set by the printer driver, the user ID and the password are associated with the information of the logged-in user and saved in the PPD. In next printing onward, when the logged-in user executes printing, the printer driver reads and sets the saved user ID and the saved password, so as to eliminate need for the user to set the user ID and the password every time printing is executed. However, in the case of printing from the application that does not use the printer driver, the printer driver is not called, and thus the saved user ID and the saved password are not able to be read.

In view of the above, according to the above-described example, the Driver of the client PC 200 determines whether the setting values are designated for the print setting by using the user interface. Even in the case where the setting values are not designated, the setting values are read from the PPD and reflected to the current print setting. As a result, user authentication can be performed even in the case of printing from the application that does not use the printer driver. Accordingly, the user can use the user authentication function more widely and easily.

Further, in the background information processing apparatus, the information (the user name) indicating the logged-in user is not linked to the print setting. Thus, in the case where the plural users share the single client PC, the different users can authenticate printing and the like by using the same authentication information.

In the client PC 200 according to the embodiment, the key name that includes a function name indicating the printer 100 as the connection destination and the user name indicating the logged-in user are linked to the print setting. In this way, even in the case where the plural users share the single client PC 200, it is possible for each of the users to authenticate printing and the like. Thus, security can further be improved.

Modification Example

In the above-described embodiment, the image forming apparatus is implemented as the printer 100. However, the present invention is not limited thereto. The image forming apparatus may be a copier, a scanner, a facsimile, or the like, for example. Alternatively, the image forming apparatus may be a multifunction peripheral (MFP) that has at least two functions of the print function, a copier function, a scanner function, and a facsimile function.

In the above-described embodiment, the setting values related to the user authentication are mainly exemplified as the print settings that can be used even when the printer driver is not used. However, the present invention is not limited thereto. As settings for the image formation (the image output) that can be used even when the driver such as the printer driver is not used, various settings that can be used in the image forming apparatus such as the printer 100 are included.

The program that is executed by the computer according to the embodiment is incorporated in advance in the ROM or the like, and is provided. In another example, the program may be recorded and provided, as a file in an installable format or an executable format, in a computer-readable recording medium such as a CD-ROM, a flexible disk (FD), a CD-R, or a Digital Versatile Disk (DVD).

Furthermore, the program executed in the embodiment may be configured that the program is stored on the computer connected to the network such as the Internet and is downloaded via the network to be provided. Moreover, the program executed in the embodiment may be provided or distributed via the network such as the Internet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
   circuitry configured to
   generate, using an application executing on the circuitry, print data;
   generate identification information, the identification information including a device name identifying a device communicably connected to the information processing apparatus via a network and a user name identifying a logged-in user;
   determine whether or not a setting value for a particular print setting was designated via a user interface determined by the application;
   read a particular setting value associated with the particular print setting from a memory when determining that the setting value for the particular print setting was not designated via the user interface, the memory storing, for one or more print settings, a corresponding setting value for each print setting, and identification information in association with one another; and
   transmit, to the device communicably connected to the information processing apparatus, the generated print data and a print command corresponding to the particular print setting.

2. The information processing apparatus of claim 1, wherein the circuitry is further configured to read the identification information associated with the particular print setting from the memory, when the setting value for the particular print setting was not designated via the user interface.

3. The information processing apparatus of claim 1, wherein the circuitry is configured to
   read, from the memory, the stored setting value associated with the generated identification information, and transmit the print data to the device identified with the generated identification information, when the setting value for the particular print setting was not designated via the user interface.

4. The information processing apparatus of claim 1, wherein the circuitry is configured to determine whether or not the setting value for the particular print setting was designated, wherein the setting value for the particular print setting is a value used for user authentication.

5. The information processing apparatus of claim 1, wherein the circuitry is further configured to store, in the memory, the particular print setting, the setting value for the particular print setting, and the identification information in association with one another, when determining that the setting value for the particular print setting was designated via the user interface.

6. The information processing apparatus of claim 5, wherein the circuitry is further configured to determine whether the setting value for the particular print setting was designated via the user interface, which allows the logged-in user to designate one or more setting values for different print settings.

7. A printing control method, performed by an information processing apparatus, the method comprising:
   generating, using an executing application, print data;
   generating identification information, the identification information including a device name identifying a device communicably connected to the information processing apparatus via a network and a user name identifying a logged-in user;
   determining whether or not a setting value for a particular print setting was designated via a user interface determined by the application;
   reading a particular setting value associated with the particular print setting from a memory when determining that the setting value for the particular print setting was not designated via the user interface, the memory storing, for one or more print settings, a corresponding setting value for each print setting, and identification information in association with one another; and transmitting, to the device communicably connected to the information processing apparatus, the generated print data and a print command corresponding to the particular print setting.

8. The print control method of claim 7, further comprising:
reading the identification information associated with the particular print setting from the memory, when the setting value for the particular print setting was not designated via the user interface.

9. The print control method of claim 7, wherein the reading step further includes reading, from the memory, the stored setting value associated with the generated identification information, the print data being transmitted to the device identified with the generated identification information.

10. The print control method of claim 7, wherein the determining step further includes determining whether or not the setting value for the particular print setting was designated, wherein the setting value for the particular print setting is a value used for user authentication.

11. The print control method of claim 7, further comprising:
storing, in the memory, the particular print setting, the setting value for the particular print setting, and the identification information in association with one another, when determining that the setting value for the particular print setting was designated via the user interface.

12. The print control method of claim 11, wherein the determining step further includes determining whether the setting value for the particular print setting was designated via the user interface, which allows the logged-in user to designate one or more setting values for different print settings.

13. A non-transitory recording medium which, when executed by circuitry of an information processing apparatus, causes the circuitry to perform a print control method comprising:
generating, using an application executing on the circuitry, print data;
generating identification information, the identification information including a device name identifying a device communicably connected to the information processing apparatus via a network and a user name identifying a logged-in user;
determining whether or not a setting value for a particular print setting was designated via a user interface determined by the application;
reading a particular setting value associated with the particular print setting from a memory when determining that the setting value for the particular print setting was not designated via the user interface, the memory storing, for one or more print settings, a corresponding setting value for each print setting, and identification information in association with one another; and
transmitting, to the device communicably connected to the information processing apparatus, the generated print data and a print command corresponding to the particular print setting.

14. The information processing apparatus of claim 1, wherein the circuitry is further configured to display the user interface, the user interface being provided by a print dialog.

15. The information processing apparatus of claim 14, wherein the circuitry is further configured to display the user interface, which is provided in part by a plug-in module of a print vendor.

16. The information processing apparatus of claim 1, wherein the circuitry is further configured to display the user interface, the user interface being provided by the application and not a print dialog.

* * * * *